US009351296B2

(12) United States Patent
Ahluwalia et al.

(10) Patent No.: US 9,351,296 B2
(45) Date of Patent: *May 24, 2016

(54) DOWNLINK MULTIPLEXING

(71) Applicant: NEC CORPORATION, Tokyo (JP)

(72) Inventors: Jagdeep Singh Ahluwalia, Tokyo (JP); Yassin Aden Awad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,692

(22) Filed: Mar. 16, 2015

(65) Prior Publication Data

US 2015/0189635 A1    Jul. 2, 2015

Related U.S. Application Data

(63) Continuation of application No. 13/731,369, filed on Dec. 31, 2012, now Pat. No. 8,995,387, which is a continuation of application No. 12/733,129, filed as application No. PCT/JP2008/064675 on Aug. 12, 2008, now Pat. No. 8,594,040.

(30) Foreign Application Priority Data

Aug. 14, 2007 (GB) .................................. 0715822.3

(51) Int. Cl.
H04W 72/04 (2009.01)
H04L 1/18 (2006.01)

(52) U.S. Cl.
CPC .......... *H04W 72/042* (2013.01); *H04L 1/1812* (2013.01); *H04W 72/04* (2013.01); *H04W 72/0446* (2013.01); *H04W 72/0453* (2013.01); *H04W 72/0406* (2013.01)

(58) Field of Classification Search
CPC ............ H04W 72/04; H04W 72/0453; H04W 72/0406
See application file for complete search history.

(56) References Cited

U.S. PATENT DOCUMENTS 5,978,368 A    11/1999   Hjelm et al.
7,596,114 B2    9/2009   Park et al.
(Continued)

FOREIGN PATENT DOCUMENTS

CN    1917706 A    2/2007
CN    1930799 A    3/2007
(Continued)

OTHER PUBLICATIONS

U.S. Notice of Allowance dated Nov. 24, 2014 in co-pending U.S. Appl. No. 13/731,369.
U.S. Office Action dated Sep. 24, 2014 in co-pending U.S. Appl. No. 13/731,369.
(Continued)

Primary Examiner — Donald Mills
Assistant Examiner — Henry Baron
(74) Attorney, Agent, or Firm — McGinn IP Law Group, PLLC.

(57) ABSTRACT

A communications node includes a memory configured to store allocation data defining an allocation of persistent downlink resources for use in communicating data between the communications node and another node of a communications system within predetermined transmission time intervals (TTIs), a receiver configured to receive control data relating to a dynamic allocation of resources to be used in a current TTI, and a controller configured to determine if a C-RNTI is present in the control data for a TTI for which a User Equipment (UE) includes persistent downlink resources, determine that the resource allocation indicated on a control channel for the TTI overrides the persistent downlink resources for the TTI, when a C-RNTI is present in the control channel for a TTI for which the UE has persistent downlink resources, and allocate persistent downlink resources for a Hybrid Automatic Repeat Request (HARQ) transmission.

3 Claims, 4 Drawing Sheets

(56) References Cited

U.S. PATENT DOCUMENTS

| | | | |
|---|---|---|---|
| 7,996,744 | B2 | 8/2011 | Ojala et al. |
| 8,386,872 | B2 | 2/2013 | Wang et al. |
| 2005/0232181 | A1 | 10/2005 | Park et al. |
| 2005/0243940 | A1 | 11/2005 | Huh et al. |
| 2005/0288030 | A1 | 12/2005 | Choi et al. |
| 2006/0205414 | A1 | 9/2006 | Teague |
| 2007/0189197 | A1 | 8/2007 | Kwon et al. |
| 2008/0232284 | A1 | 9/2008 | Dalsgaard et al. |
| 2008/0310355 | A1 | 12/2008 | Cai et al. |
| 2009/0247178 | A1 | 10/2009 | Lunden et al. |
| 2009/0287976 | A1 | 11/2009 | Wang et al. |
| 2011/0182245 | A1* | 7/2011 | Malkamaki et al. .......... 370/329 |

FOREIGN PATENT DOCUMENTS

| | | |
|---|---|---|
| CN | 101005339 A | 7/2007 |
| EP | 1 809 064 A2 | 7/2007 |
| WO | WO 00/10334 | 2/2000 |
| WO | WO 2006/099062 A1 | 9/2006 |
| WO | WO 2006/130741 A1 | 12/2006 |
| WO | WO 2007/016031 A2 | 2/2007 |
| WO | WO 2007/065272 A1 | 6/2007 |

OTHER PUBLICATIONS

U.S. Office Action dated Mar. 4, 2014 in co-pending U.S. Appl. No. 13/731,369.
Chinese Office Action dated Nov. 4, 2014 with English Translation.
QUALCOMM Europe: R1-060173, "Considerations for control signalling support of Real Time Services", Internet Citation, (Online) Jan. 25, 2006, Helsinki, Finland, XP-002474504, 3GPP TSG-RAN WG1 LTE Ad Hoc.
NEC: "Persistent Scheduling and dynamic allocation", 3GPP TSG-RAN WG2 #55, (Online) No. RS-062788, Oct. 9, 2006, Oct. 13, 2006 XP00251094 Seoul.
NTT Docomo et al: "L1/L2 Control Channel Structure for E-UTRA Downlink", 3rd Generation Partnership Project (3GPP); Technical Specification Group (TSG) Radio Access Network (RAN); Working Group 1 (WG1), XX, XX, No. RI-061544, May 8, 2006, pp. 1-17, XP002469360, paragraph (0003); table 1.
NEC Group, "DL Multiplexing for Persistent and Dynamic scheduling", 3GPP TSG-RAN WG1#50Bis, R1-074164, Oct. 12, 2007.
Japanese Office Action dated Apr. 25, 2012.
International Search Report (PCT/ISA/210) dated Jan. 30, 2009.
Office Action dated Jun. 5, 2012 in U.S. Appl. No. 12/733,129.
Office Action dated Dec. 5, 2012 in U.S. Appl. No. 12/733,129.
Notice of Allowance dated Jul. 18, 2013 in U.S. Appl. No. 12/733,129.

* cited by examiner

DOWNLINK MULTIPLEXING

The present application is a Continuation Application of U.S. patent application Ser. No. 13/731,369, filed on Dec. 31, 2012, which is a Continuation Application of U.S. patent application Ser. No. 12/733,129, filed on Feb. 12, 2010, now U.S. Pat. No. 8,594,040, which is based on and claims priority from international application No. PCT/JP2008/064675, filed on Aug. 12, 2008, which is based on and claims priority from GB0715822.3, filed on Aug. 14, 2007, the entire contents of which are incorporated herein by reference.

TECHNICAL FIELD

The present invention relates to the communication of data within a mobile (cellular) communication system. The invention has particular, although not exclusive relevance to the allocation of sub-carriers used in a wireless communication system.

BACKGROUND ART

OFDMA and single carrier FDMA have been selected as the downlink and uplink multiple access schemes for the E-UTRA (Evolved Universal Terrestrial Radio Access) air interface currently being studied in 3GPP (which is a standard based collaboration looking at the future evolution of third generation mobile telecommunication systems). Under the E-UTRA system, a base station which communicates with a number of user devices allocates the total amount of time/frequency resource (depending on bandwidth) among as many simultaneous users as possible, in order to enable efficient and fast link adaptation and to attain maximum multi-user diversity gain.

The E-UTRA system provides for both real time (RT) services, such as VoIP (Voice over Internet Protocol), and non-real time (NRT) services, such as web browsing. The time/frequency resources that allow user devices to use these services may be allocated dynamically (i.e., on demand at the time that they are needed) or persistently depending on the service used. For example, for real time services such as VoIP, where the amount of resources needed is known in advance, the user devices can be allocated the resources in advance (persistently allocated), for example at the time of the call setup. For more "bursty" traffic, such as web browsing traffic, the resources would be allocated dynamically based on the amount of data to be transmitted between the user device and the network at the time.

The current working assumption in RAN1 is that if the user device has persistently allocated resources in a given Transmission Time Interval (TTI); no other resources could be allocated to the user device for data/signalling within the same TTI, except within the Dynamic Broadcasting Channel (DBCH).

DISCLOSURE OF INVENTION

According to one exemplary aspect, the present invention provides a system in which user devices can use both dynamically and persistently allocated resources within the same TTI, to receive downlink data from the network.

One exemplary embodiment provides a method performed by a node of a communications system, the method comprising: storing allocation data defining persistently allocated resources for use in communicating data between the node and another node of the communications system within predetermined transmission time intervals; receiving control data defining an allocation of new resources to be used; determining if the received control data includes a predefined bit pattern; and depending on whether or not said determining step determines that said received control data includes said predefined bit pattern: i) communicating with said other node using the new resources instead of the persistently allocated resources identified by the stored allocation data; or ii) communicating with said other node using the resources identified by the stored allocation data and the new resources allocated by the received control data.

Preferably, the control data has a predefined structure including an ID field for holding ID data identifying the node, an allocation field for holding data defining the new resources and one or more other fields for holding parameters required for communicating with the new resources, wherein when the control data is for defining a reallocation of said persistently allocated resources, at least one of said one or more other fields includes said predefined bit pattern instead of one or more of said parameters and wherein the node uses previous parameters for the one or more parameters replaced by said predefined bit pattern.

In one exemplary embodiment, the control data includes an ID field for ID data identifying the node, an allocation data field for allocation data defining the new resources and an antenna data field and wherein said predefined bit pattern is defined by data within said antenna data field.

In another exemplary embodiment, the control data includes an ID field for ID data identifying the node, an allocation data field for allocation data defining the new resources and a transport format data field and wherein said predefined bit pattern is defined by data within said transport format data field.

In a further exemplary embodiment, the control data includes an ID field for ID data identifying the node, an allocation data field for allocation data defining the new resources and an HARQ (Hybrid Automatic Repeat Request) data field and wherein said predefined bit pattern is defined by data within said HARQ data field.

In one exemplary embodiment the control data includes predefined data fields for: ID data, resource assignment data, antenna data, transport format data and HARQ data, and wherein said predefined bit pattern is located within one or more of the antenna data field, the transport format data field and the HARQ data field. Preferably the predefined bit pattern is defined by a reserved value not used to define the corresponding parameter value.

In some exemplary embodiments, the transport format data field will include a subfield for a modulation scheme to use and a subfield for defining a payload size of data packets to be communicated using the assigned resources and wherein the predefined bit pattern is located within one of those subfields.

The resource allocations are preferably for allocating downlink resources, although in other exemplary embodiments, they may be used to define uplink resources. When the resource allocations relate to downlink allocations, the node may also transmit multiple ACK/NACKs. In this case, a multi-bit modulation scheme is preferably used, such as QPSK (Quadrature Phase-Shift Keying) instead of the usual binary modulation scheme such as BPSK (Binary Phase-Shift Keying). In this way, the up link control channel used for ACK/NACKs also does not need to change.

An exemplary embodiment also provides a method performed by a node of a communications system, the method comprising: storing allocation data defining persistently allocated resources for use in communicating data between the node and another node of the communications system within predetermined transmission time intervals; generating control data defining an allocation of new resources to be used; determining whether or not to include a predefined bit pattern within the control data, depending on whether or not the new resources are to be used in addition to the persistently allocated resources or instead of the persistently allocated resources; transmitting the generated control data to the other node for controlling the resources used; and depending on whether or not said control data includes said predefined bit pattern: i) communicating with said other node using the new resources instead of the persistently allocated resources identified by the stored allocation data; or ii) communicating with said other node using the persistently allocated resources identified by the stored allocation data and the new resources allocated by the received control data.

Preferably, the generating step generates control data having a predefined structure including an ID field for holding ID data identifying the node, an allocation field for holding data defining the new resources and one or more other fields for holding parameters required for communicating with the new resources, wherein when said determining step determines that the new resources are to be used instead of said persistently allocated resources, said generating step sets one or more of said other fields with said predefined bit pattern instead of the corresponding one or more parameters and wherein when communicating with the other node using the new resources, the node uses the corresponding one or more parameters forming part of said stored allocation data for the one or more parameters replaced by said predefined bit pattern.

The invention provides, for all methods disclosed, corresponding computer programs or computer program products (computer implementable instructions product) for execution on corresponding equipment, the equipment itself (user equipment, nodes or components thereof) and methods of updating the equipment.

These and various other aspects of the invention will become apparent, from the following detailed description of exemplary embodiments which are given by way of example only and which are described with reference to the accompanying Figures in which:

BEST MODE FOR CARRYING OUT THE INVENTION

Overview

Figure 1:
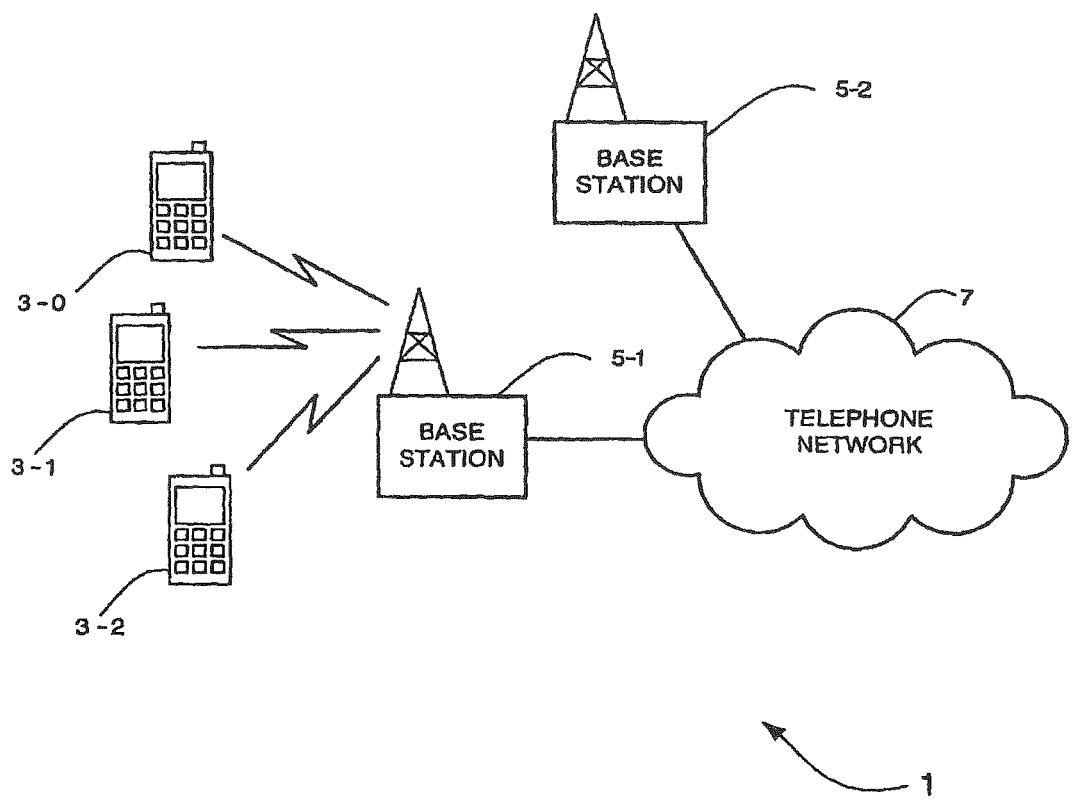
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones 3-0, 3-1, and 3-2 can communicate with other users (not shown) via a base station 5 and a telephone network 7. In this exemplary embodiment, the base station 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the amount of data to be sent to the mobile telephone 3. In this exemplary embodiment the base station 5 also allocates the sub-carriers used to carry the data to the respective mobile telephones 3 in order to try to maintain a uniform distribution of the mobile telephones 3 operating across the base station's bandwidth. To achieve these goals, the base station 5 dynamically allocates sub-carriers for each mobile telephone 3 and signals the allocations for each time point (sub-frame) to each of the scheduled mobile telephones 3.

In this exemplary embodiment, the base station 5 may dynamically allocate resources for downlink transmissions during transmission intervals in which the mobile telephone 3 is already scheduled to receive persistently scheduled data. In order to ensure that the mobile telephone 3 interprets the dynamic allocation of resources correctly, the base station 5 encodes appropriate data into the control channel used to carry the data defining the new allocation. It does this, in this exemplary embodiment, without changing the DL L1/L2 control channel structure used to signal the resource allocations.

Time/Frequency Resources

Figure 2:
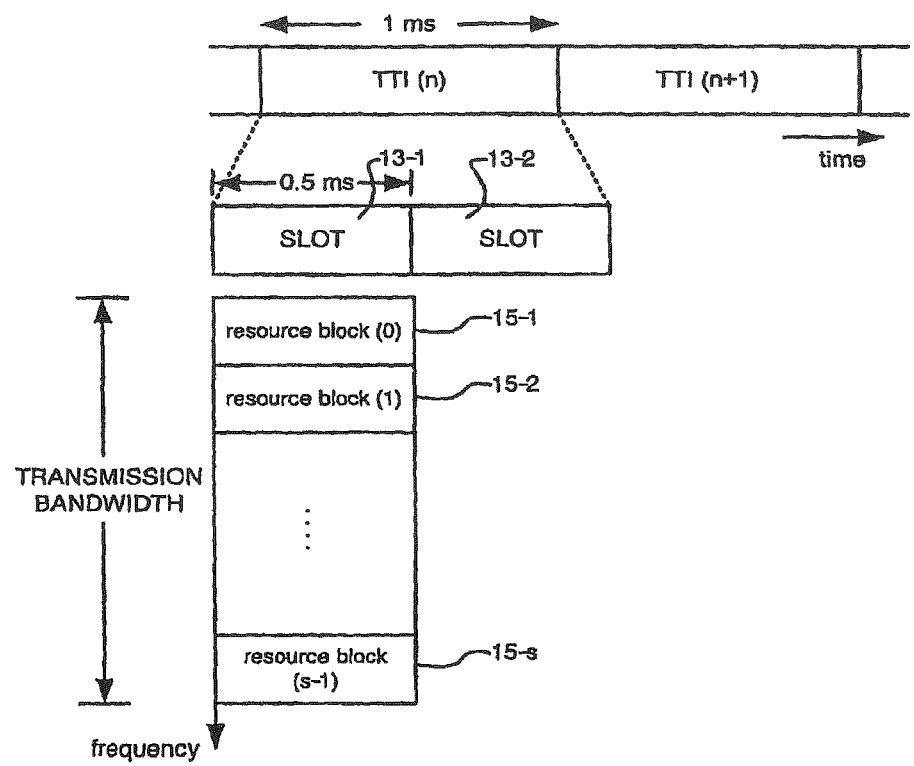
FIG. 2 is a schematic diagram illustrating the structure of the Transmission Time Intervals used in the communication system shown in FIG. 1.

In this exemplary embodiment, the available transmission bandwidth is divided into a number of resource blocks, each of which comprises a number of contiguous sub-carriers (i.e. 12 subcarriers) arranged in contiguous blocks. Different mobile telephones 3 are allocated different resource block(s) (sub-carriers) for transmitting/receiving their data. FIG. 2 illustrates E-UTRA's latest definition of the transmission channel as comprising a sequence of 1 ms Transmission Time Intervals (TTIs) 11-1, 11-2, each of which consists of two 0.5 ms slots 13-1 and 13-2. As shown, the available transmission bandwidth is divided into S resource blocks (RBs) 15-1 to 15-s and each mobile telephone 3 is scheduled to transmit its uplink data and receive its downlink data in selected slots 13 and in selected resource block (RB) 15. It is also possible each mobile telephone 3 to be assigned multiple resource blocks (RBs).

Base Station

Figure 3:
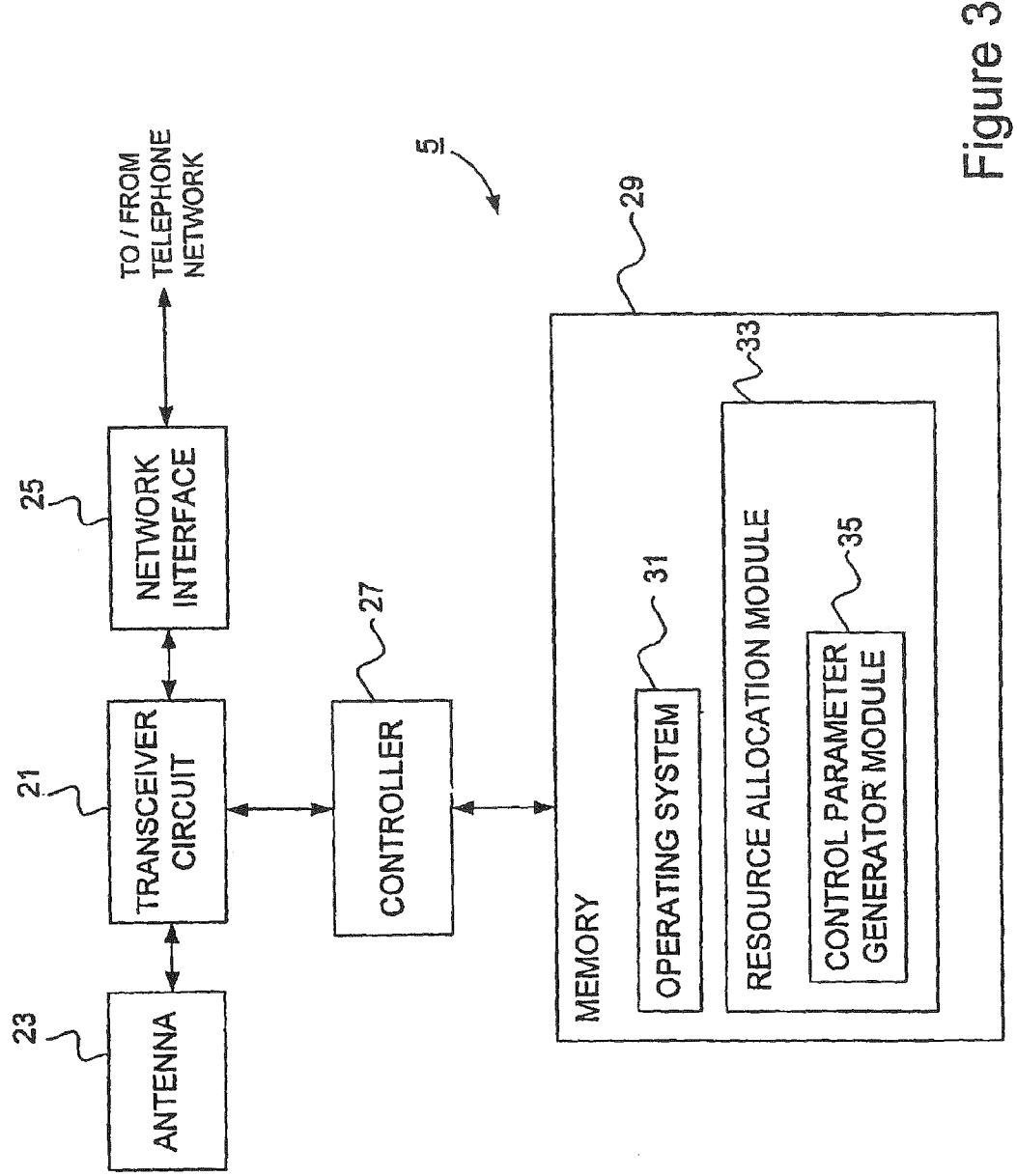
FIG. 3 is a block diagram illustrating the main components of the base station shown in FIG. 1.

FIG. 3 is a block diagram illustrating the main components of the base station 5 used in this exemplary embodiment. As shown, the base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a resource allocation module 33. The resource allocation module 33 is operable for allocating the sub-carriers used by the transceiver circuit 21 in its communications with the mobile telephones 3. As shown in FIG. 3, the resource allocation module 33 includes control parameter generator module 35 for generating the required control parameters for defining the allocated resources.

Mobile Telephone

Figure 4:
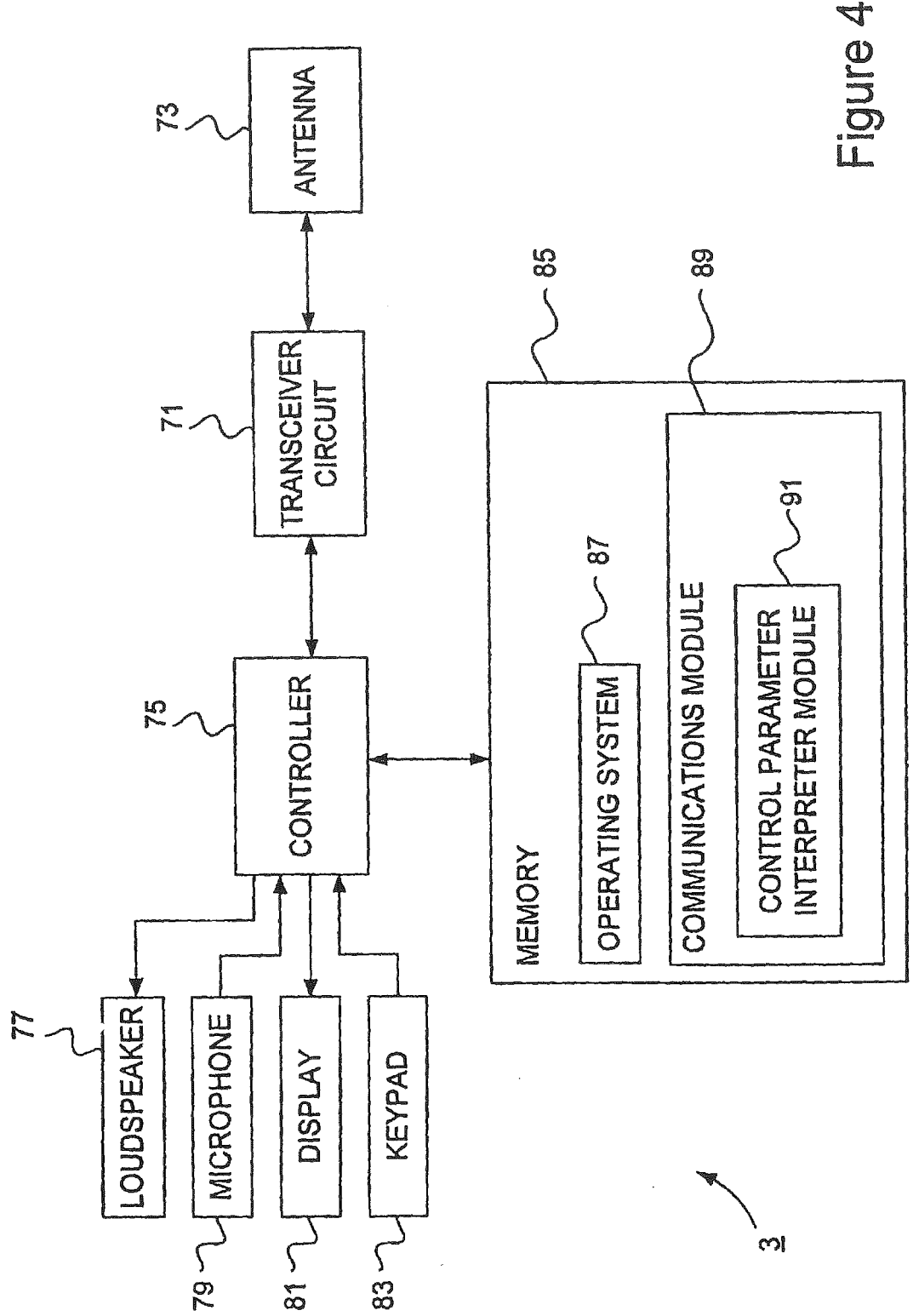
FIG. 4 is a block diagram illustrating the main components of one of the mobile telephones shown in FIG. 1.

FIG. 4 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a communications module 89. In this exemplary embodiment, the communications module 89 includes a control parameter interpreter module 91 for interpreting received control parameters that define a resource allocation.

In the above description, the base station 5 and the mobile telephones 3 are described for ease of understanding as having a number of discrete modules (such as the resource allocation module, control parameter generator module, communications module and control parameter interpreter module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

The current E-UTRAN (Evolved Universal Terrestrial Radio Access Network) specification states that in the downlink, resources (physical resource blocks (PRBs) and Modulation & coding scheme (MCS)) can be dynamically allocated to a mobile telephone 3 at each TTI via the C-RNTI on the L1/L2 control channel(s). A mobile telephone 3 always monitors the L1/L2 control channel(s) in order to find a possible allocation when its downlink reception is enabled (activity governed by DRX—discontinuous reception).

In addition, E-UTRAN can allocate predefined downlink resources for the first HARQ transmissions to mobile telephones 3. When required, retransmissions are explicitly signalled via the L1/L2 control channel(s). In the sub-frames where the mobile telephone 3 has been pre-assigned resources, if the mobile telephone 3 cannot find its C-RNTI on the L1/L2 control channel(s), a downlink transmission according to any pre-defined allocation that the mobile telephone 3 has been assigned in the TTI is assumed. As a result, the mobile telephone 3 performs blind decoding of the pre-defined resources (the subset of pre-defined resources shall be set in accordance with the mobile telephone's capability). Otherwise, in the sub-frames where the mobile telephone 3 has been pre-assigned resources, if the mobile telephone 3 finds its C-RNTI on the L1/L2 control channel(s), the L1/L2 control channel allocation overrides the pre-defined allocation for that TTI and the mobile telephone 3 does not perform blind decoding of the pre-defined resources.

Given this current proposal, if the base station 5 needs to dynamically allocate downlink resources in the same TTI where predefined downlink resources (persistently scheduled) for the first HARQ transmissions are scheduled for the mobile telephone 3, a mechanism has to be provided which will enable the mobile telephone 3 to interpret the DL resource allocation differently without changing the DL control channel structure.

There are four possible allocations that can happen as shown in Table 1. Persistently scheduled allocations are not signalled in the DL L1/L2 control channel; as they are signalled from higher layers (i.e. L3).

TABLE 1

| Four Possible Allocations that can happen | | |
|---|---|---|
| Reallocation of Persistently Allocated Resources | New dynamic allocated resources | Comments |
| Persistently scheduled resources go as usual, there is no control channel. | Not-allocated. | There are no control channels |
| Reallocation overrides the persistently scheduled resources, there is control channel. | Not-allocated. | There is one control channel |
| Persistently scheduled resources go as usual, there is no control channel. | Allocated, there is control channel. | There is one control channel |
| Reallocation overrides the persistently scheduled resources, there is control channel. | Allocated, there is control channel. | There are two control channels |

As can be seen from Table 1, whenever a dynamic allocation is being made or whenever the persistently scheduled resources are to be reallocated, the base station 5 must generate and transmit control data over a control channel to the mobile telephone 3 to define the desired change. The last row of the table defines the situation where the base station 5 wishes to provide a dynamic allocation of the resources to be used in the current TTI and at the same time change the persistently allocated resources. This will require the use of two control channels within the same TTI to carry the appropriate control data to the mobile telephone 3. Currently, the proposal is to have a maximum of one control channel within each TTI for each mobile telephone 3. Therefore, the situation defined in the last row of Table 1 would not be supported by the current proposal. However, if the current proposal changes to allow the transmission of two control channels for a single mobile telephone 3 in the same TTI, then this situation would also be supported.

As will be apparent from the above discussion, the two cases that need to be distinguished by the mobile telephone 3 within the same TTI are:

1) Reallocation of predefined (persistently scheduled) downlink resources; and

2) New dynamic allocated resources.

The DL Control Channel Parameters that are generated by the base station 5 and transmitted to the mobile telephone 3 are shown in Table 2 below. The inventors believe that the required distinction can be achieved if the base station 5 sets the Transport Format or HARQ related information differently for the two cases and the mobile telephone 3 interprets the control data accordingly.

TABLE 2

| DL Control Channel Parameters | | |
|---|---|---|
| Control signaling information | Number of bits | Comments |
| Mobile telephone ID | 16 | 16-24 bit CRC |
| Resource assignment | Maximum 18, 28, 37 bits for 5, 10, 20 MHz | Location of the resource blocks assigned to each mobile telephone in a TTI for DL transmission. |
| Multi-antenna info | [2] | Antenna information |
| Transport Format Info. (Transport Block Size + MCS) | [8] | 2 bits for modulation scheme, 6 bits for payload size. |

TABLE 2-continued

DL Control Channel Parameters

| Control signaling information | Number of bits | Comments |
| --- | --- | --- |
| HARQ-related information | [5] | 3 bits for process number, 2 bits for redundancy version and new data indicator. |

As shown in table 2, the DL Control Channel parameters that need to be set for the two cases are:

Reallocation of Persistently Allocated Resources: Multi-antenna info/Transport Format/HARQ related Information can be set to specific pattern. Because, some of the information carried on the Multi-antenna info, Transport Format and HARQ related Information are not changed during reallocation of the persistently allocated resources, the pattern can be the two bits of the Multi-antenna info (for example bit pattern 11), and/or the last two bits of the Modulation scheme (for example bit pattern 11) in the Transport Format and/or the last three bits of the HARQ process number (for example bit pattern 111). Which part of the control parameters would be set in this pattern is, in this exemplary embodiment, determined in advance and known to the mobile telephone 3 and the base station 5.

New Resource allocation for Data/Signalling: All the control channel parameters would be set as usual for dynamically scheduled packet data.

Therefore, if the mobile telephone 3 receives DL control channel parameters in a current TTI in which it has persistently allocated resources, it first checks to see if the received parameters contain the predefined bit pattern in the appropriate location. If it finds the pattern, then it interprets the allocation as a reallocation of the persistently allocated resources; and if it does not find the pattern, then it treats the allocation as a new allocation for dynamically scheduled packet data. If it is a reallocation of the persistently allocated resources, the missing parameter information replaced by the bit pattern is taken from the control data that originally signalled the persistent allocation. For example if the bit pattern is included in the multi-antenna information field of the control data, then the mobile telephone 3 assumes that this information is not changed and uses the multi-antenna information that is stored for the persistently allocated resources (and which was signalled to the mobile telephone 3 at the time that the persistent allocation was originally signalled).

ACK/NACK Feedback

The proposed DL multiplexing deals only with a mixture of persistently scheduled and dynamically scheduled services. In this case, two HARQ processes are possible at maximum, resulting in two ACK/NACKs (2 bits) to be sent on the UL feedback (as opposed to one bit currently). This data can be sent using QPSK modulation and so, with this proposal, no modification is required for the UL control signalling either.

Conclusion

This patent application describes DL multiplexing for the case of simultaneous transmission of persistently scheduled and dynamically scheduled services. The advantages of doing so include:

1) From a scheduling point of view, having both Persistent and Dynamic allocation within one sub frame would be very efficient.

2) Resources for RRC/L2 signalling/Data could be dynamically allocated in the same sub frame in which VoIP packets are persistently scheduled.
3) Increases DL capacity.
4) Increased Battery life of the mobile telephone 3 as the "On-Duration" of the mobile telephone during DRX operation can be reduced.
5) Different HARQ profile for VoIP (having persistently allocated resource) and Data (having dynamically allocated resource) is possible by having separate ACK/NACK for the different bearer types.

In addition, no modification is required to the current DL or UL L1/L2 control structure to accommodate the proposed multiplexing. The only requirement is the provision of a mechanism that will allow the mobile telephone 3 to distinguish between reallocation of Persistently Allocated Resources and the allocation of New Dynamic resources, such as by putting a predefined bit pattern in one or more of the DL Control Channel Parameters for the reallocation of the persistently allocated resources.

Modifications and Alternatives

A number of detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

In the above exemplary embodiments, a mobile telephone based telecommunication system was described in which the above described signalling techniques were employed. As those skilled in the art will appreciate, the signalling of such resource allocation data can be employed in any communication system that uses a plurality of sub-carriers. In particular, the signalling techniques described above can be used in wire or wireless based communications either using electromagnetic signals or acoustic signals to carry the data. In the general case, the base station would be replaced by a communication node which communicates with a number of different user devices. User devices may include, for example, personal digital assistants, laptop computers, web browsers, etc.

In the above exemplary embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements not, therefore, be construed as limiting the present invention in any way.

Introduction

The current assumption in RAN 1 is that if the UE is having persistently allocated resources in a given TTI for example VoIP Service; no other resources could be allocated to the UE for data/signalling within the same TTI except with Dynamic Broadcasting Channel (DBCH). The restriction of having one transport block per TTI for the unicast transmissions comes from the fact that there will be only 1 HARQ process for non-MIMO case.

This issue was last discussed in RAN1#46bis in Seoul, October 06 and since then there have not been any further discussion on this topic in subsequent meetings. In this contribution, we revisit this working assumption and discuss if the working assumption needs to be modified for simultaneous reception of persistently scheduled and dynamically scheduled services for one user in a TTI for DL transmissions.

Discussion

The main reason for agreeing this working assumption was that the DL control Channel structure and the resources needed for sending HARQ ACK/NACKS were not clear at that time. However, with progress on the DL Control channel structure: a) the proposal to separate out the ACK/NACK for persistently scheduled UE's and the dynamically scheduled UE's, b) the L1 L2 signaling is basically not used to assign resources to the persistently scheduled UEs, we believe that these restrictions are no longer necessary. Further more, if multiple HARQ processes within one sub frame are allowed, UE could receive both a persistently scheduled (e.g. VOIP) packet and a dynamically scheduled (data) packet in the same sub-frame in the DL transmissions.

The possible benefits this could bring are:

From scheduling point of view, having both Persistent and Dynamic allocation within one sub frame would be very efficient.

Resources for RRC/L2 signalling/Data could be dynamically allocated in the same sub frame in which VoIP packets are persistently scheduled.

Increases DL capacity

Increased Battery life of the UE as the "On-Duration" of UE during DRX operation can be reduced.

Different HARQ profile for VoIP (having persistently allocated resource) and Data (having dynamically allocated resource) is possible by having separate ACK/NACK for different bearer type.

One could argue that this would increase UE complexity; however we believe that such functionality can be considered as a part of higher class/category UE. Early deployment UE may not implement such functionality. *Mechanism for differentiating new dynamic allocation and persistent reallocation* Stage 2 Technical Specification states that:

"In the downlink, E-UTRAN can dynamically allocate resources (PRBs and MCS) to UEs at each TTI via the C-RNTI on L1/L2 control channel(s). A UE always monitors the L1/L2 control channel(s) in order to find possible allocation when its downlink reception is enabled (activity governed by DRX).

In addition, E-UTRAN can allocate predefined downlink resources for the first HARQ transmissions to UEs. When required, retransmissions are explicitly signalled via the L1/L2 control channel(s). In the sub-frames where the UE has been pre-assigned resources, if the UE cannot find its C-RNTI on the L1/L2 control channel(s), a downlink transmission according to any pre-defined allocation that the UE has been assigned in the TTI is assumed. As a result, the UE performs blind decoding of the pre-defined resources (the subset of pre-defined resources shall be set in accordance to UE's capability). Otherwise, in the sub-frames where the UE has been pre-assigned resources, if the UE finds its C-RNTI on the L1/L2 control channel(s), the L1/L2 control channel allocation overrides the pre-defined allocation for that TTI and the UE does not perform blind decoding of the pre-defined resources".

Given this, if we need to dynamically allocate downlink resources in the same TTI where the predefined downlink resources (persistently scheduled) for the first HARQ transmissions are scheduled for a UEs, we need to define a mechanism which will enable the UE to interpret DL grant differently without changing the DL control channel structure.

The two cases that need to be distinguished by the UE within the same TTI are:

1) Reallocation of predefined (persistently scheduled) downlink resources
2) New dynamic allocated resources.

There are four possible allocations that can happen as shown on Table 1. Persistently scheduled allocation does not use DL L1 L2 control channel, but it is being signalled from higher layers (i.e., L3).

TABLE 1

Four Possible Allocations that can happen

| Reallocation of Persistently Allocated Resources | New dynamic allocated resources | Comments |
|---|---|---|
| Persistently scheduled resources go as usual, there is no control channel. | Not-allocated. | There are no control channels |
| Reallocation overrides the persistently scheduled resources, there is control channel. | Not-allocated. | There is one control channel |
| Persistently scheduled resources go as usual, there is no control channel. | Allocated, there is control channel. | There is one control channel |
| Reallocation overrides the persistently scheduled resources, there is control channel. | Allocated, there is control channel. | There are two control channels |

DL Control Channel Parameters are shown in Table 2 below. We believe that the distinction can be done if eNB sets the Transport Format and HARQ related information differently for the two cases and the UE interprets it accordingly.

As shown on table, DL Control Channel parameters that need to be set by for two cases are:

Reallocation of Persistently Allocated Resources: Multi-antenna info/Transport Format/HARQ related Information can be set to specific pattern. Because, some of the information carried on the Multi-antenna info, Transport Format and HARQ related Information are not changed during reallocation of the persistently allocated resources. The pattern can be the last three bits of the Multi-antenna info (11), and or the last two bits of the Modulation scheme (11) in the Transport Format and or the last three bits of the HARQ process number (111).

New Resource allocation of Data/Signalling: All the parameters would be set as usual for dynamically scheduled packet data.

TABLE 2

DL Control Channel Parameters

| Control signaling information | Number of bits | Comments |
|---|---|---|
| UE ID | 16 | 16-24 bit CRC |
| Resource assignment | Maximum 18, 28, 37 bits for 5, 10, 20 MHz | Location of the resource blocks assigned to each UE in a TTI for DL transmission. |

TABLE 2-continued

DL Control Channel Parameters

| Control signaling information | Number of bits | Comments |
| --- | --- | --- |
| Multi-antenna info | [2] | Antenna information |
| Transport Format Info. (Transport Block Size + MCS) | [8] | 2 bits for modulation scheme, 6 bits for payload size. |
| HARQ-related information | [5] | 3 bits for process number, 2 bits for redundancy version and new data indicator. |

ACK/NACK Feedback

The proposed DL multiplexing deals only a mixture of persistently scheduled and dynamic scheduled services. In this case, two HARQ processes are possible at maximum, resulting 2 ACK/NACKs (2 bits) to be sent on the UL feedback using QPSK modulation. So, with this proposal, no modification is required for the UL control signalling.

CONCLUSION

In this contribution, we have discussed and revisited the DL multiplexing for the case of simultaneous transmission of persistently scheduled and dynamic scheduled services. We highlighted the benefits of having such multiplexing for LTE downlink transmissions. In addition, no modification is required to the current DL/UL L1 L2 control structure to accommodate the proposed multiplexing. It is only required to distinguish between reallocation of Persistently Allocated Resources and the allocation of New Dynamic resources by putting a unique pattern in some of the DL Control Channel Parameters for the reallocation of the Persistently Resources. So, we recommend RAN1/RAN2 to revisit the current working assumption and allow simultaneous reception of persistently scheduled and dynamically scheduled services for one user in a TTI for DL transmissions.

This application is based upon and claims the benefit of priority from United Kingdom Patent Application No. 0715822.3, filed on Aug. 14, 2007, the disclosure of which is incorporated herein in its entirety by reference.

The invention claimed is:

1. A communications node, comprising:
a memory configured to store allocation data defining an allocation of persistent downlink resources for use in communicating data between the communications node and another node of a communications system within predetermined transmission time intervals (TTIs);
a receiver configured to receive control data relating to a dynamic allocation of resources to be used in a current TTI; and
a controller configured to:
determine if a C-RNTI is present in the control data for a TTI for which a User Equipment (UE) includes persistent downlink resources;
determine that the resource allocation indicated on a control channel for the TTI overrides the persistent downlink resources for the TTI, when a C-RNTI is present in the control channel for a TTI for which said UE has persistent downlink resources; and
allocate persistent downlink resources for a Hybrid Automatic Repeat Request (HARQ) transmission.

2. A communications method, comprising:
storing allocation data defining an allocation of persistent downlink resources for use in communicating data between a communications node and another node of a communications system within predetermined transmission time intervals (TTIs);
receiving control data relating to a dynamic allocation of resources to be used in a current TTI;
determining if a C-RNTI is present in the control data for a TTI for which a User Equipment (UE) includes persistent downlink resources;
determining that the resource allocation indicated on the control channel for the TTI overrides the persistent downlink resources for the TTI, when a C-RNTI is present in the control channel for a TTI for which said UE has persistent downlink resources; and
allocating persistent downlink resources for a Hybrid Automatic Repeat Request (HARQ) transmission.

3. A non-transitory computer-readable storage medium encoded with a computer program for causing a programmable computer device to carry out the method of claim 2.

* * * * *